July 12, 1949.    N. ROCHESTER    2,476,066
CRYSTAL MATRIX
Filed May 6, 1948                4 Sheets-Sheet 1
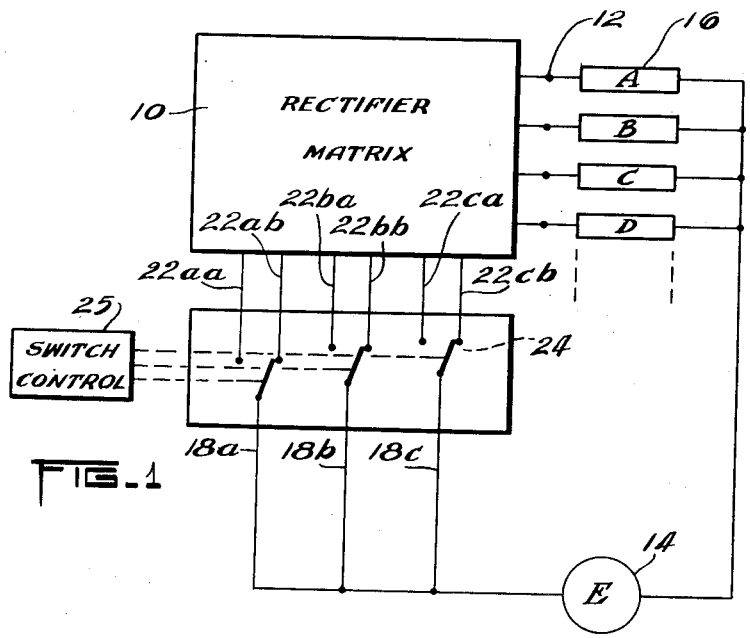
FIG_1
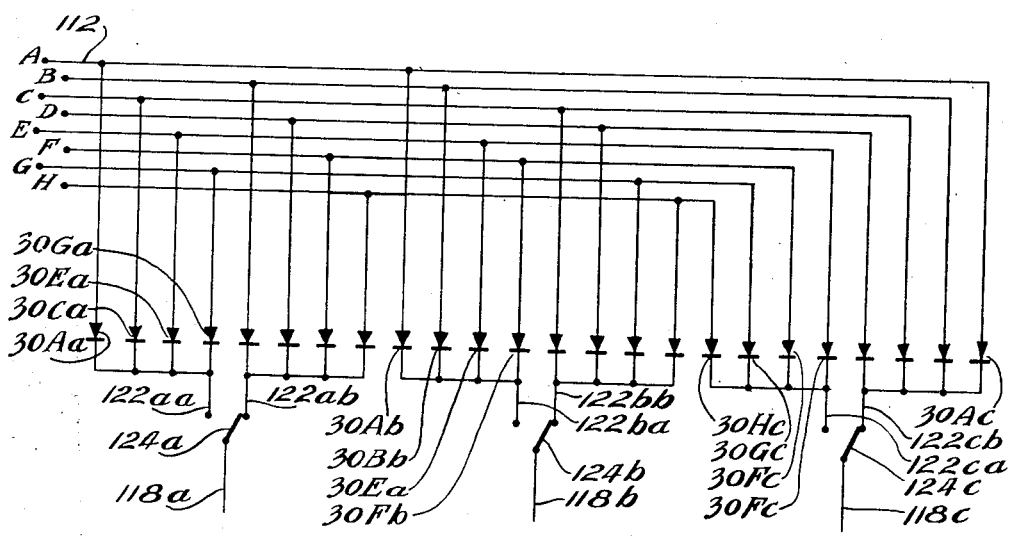
FIG_2
INVENTOR.
Nathaniel Rochester
BY
Attorney

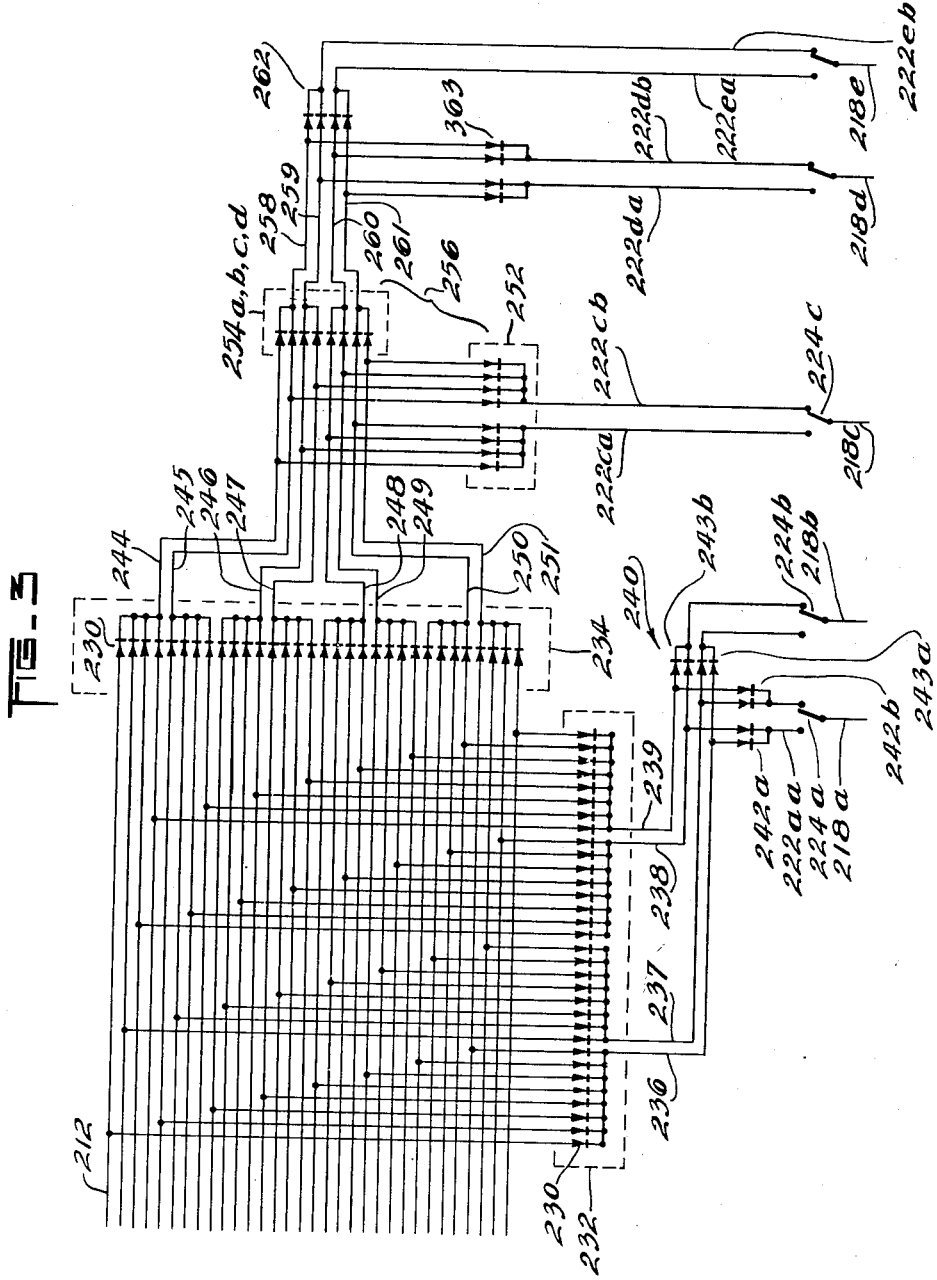

July 12, 1949.  N. ROCHESTER  2,476,066
CRYSTAL MATRIX
Filed May 6, 1948  4 Sheets-Sheet 4
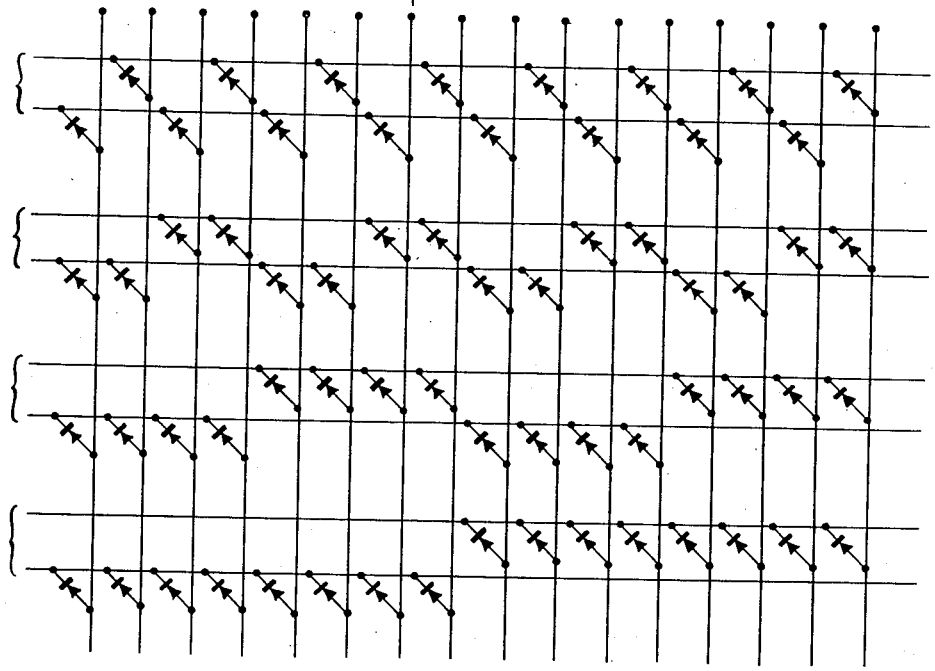
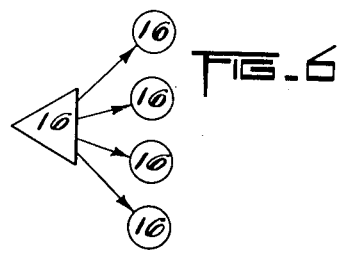
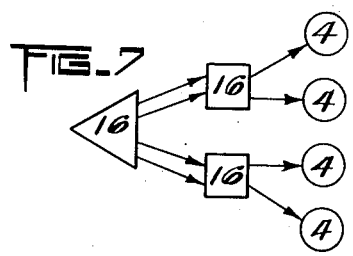
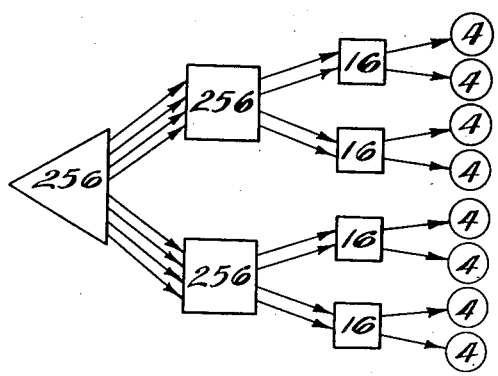
INVENTOR.
Nathaniel Rochester
BY
Attorney Patented July 12, 1949

2,476,066

UNITED STATES PATENT OFFICE 2,476,066

CRYSTAL MATRIX

Nathaniel Rochester, Milton, Mass., assignor to Sylvania Electric Products Inc., a corporation of Massachusetts Application May 6, 1948, Serial No. 25,432

7 Claims. (Cl. 177—353)

The present invention relates to rectifier matrices that are employed for switching purposes.

In a known class of rectifier networks, the selective terminals of a number of two-position switching devices in an equal number of channels can be caused to render effective one line of a plurality of lines (not greater than two raised to a power corresponding to the number of channels) the effective line depending upon the combined setting of all the switching devices. The rectifier matrix is sometimes regarded as a form of switching matrix because it can variably route signals between a number of channels, or sets (usually pairs) of lines taken in varied permutations, and a larger number of individual lines. As a routing switch, the rectifier matrix is notable for its high speed of achieving the desired circuit conditioning.

The rectangular matrix and the pyramidal matrix, as known forms of matrices are known, are limited as a practical matter to a relatively modest number of channels. An object of the present invention is the simplification of rectifier matrices and the improvement of their performance. More particularly, an object of this invention is to provide a rectifier matrix requiring a minimum number of rectifiers for achieving the desired selective interaction between a large number of individual lines and a multiplicity of channels having paired oppositely conditioned lines.

The nature of the invention, its application, and further objects and features of novelty will be better appreciated from the following detailed disclosure including several embodiments of the invention. In the drawings:

Fig. 1 is a block diagram to aid in describing a variety of uses of rectifier matrices;

Fig. 2 is a wiring diagram of a three-channel, eight-line rectangular rectifier matrix;

Fig. 3 is a wiring diagram of a five-channel, thirty-two line matrix embodying certain aspects of the present invention;

Figure 4:
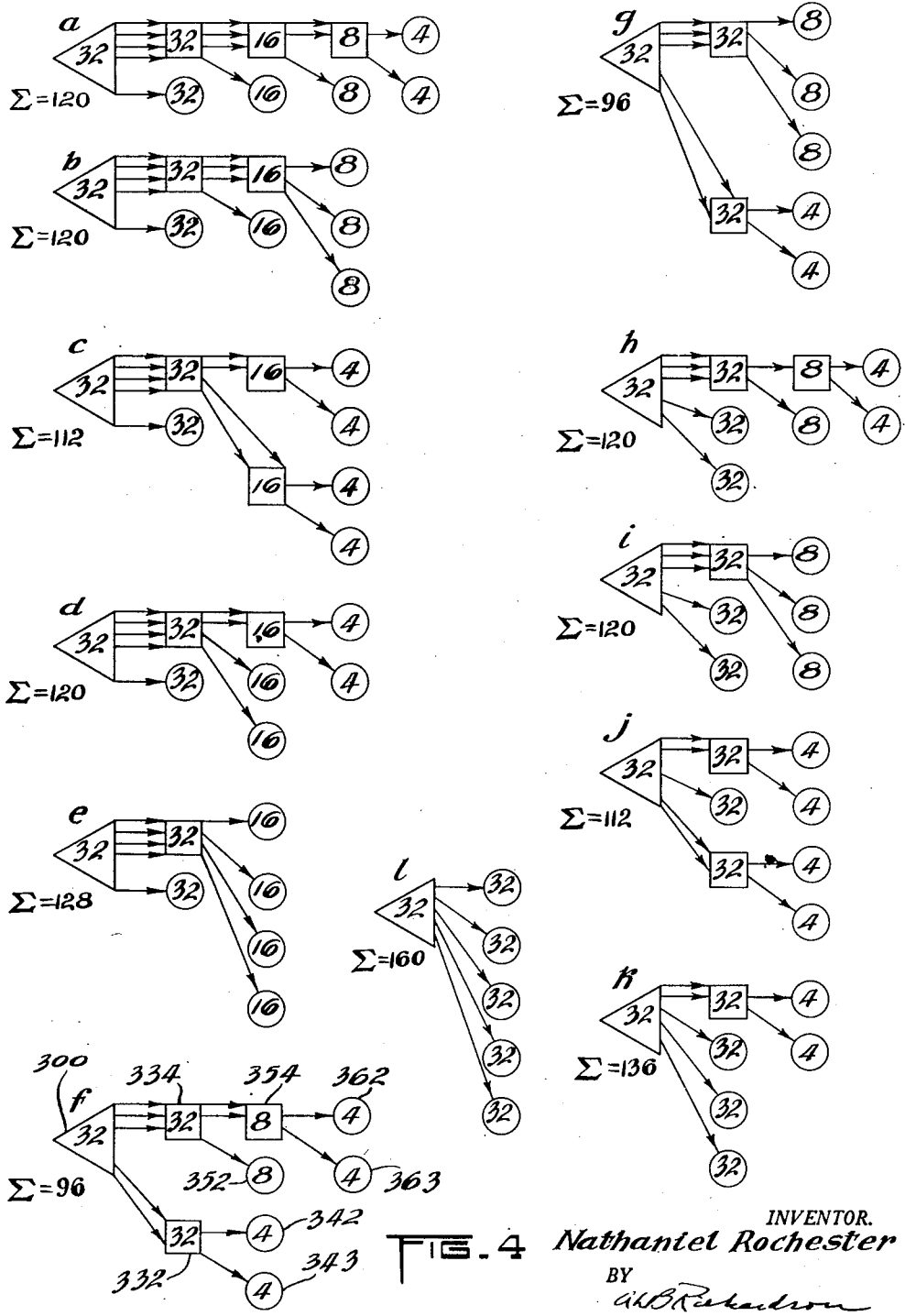

Figs. 4a and l are symbolic diagrams of the known five-channel matrices, representing respectively the pyramidal form and the rectangular form, while Figs. 4b–k are diagrams of various additional novel five-channel matrices using the same symbolic notation;

Fig. 5 is the wiring diagram of a four-channel, sixteen-line rectangular matrix shown in a form to justify the term "rectangular";

Fig. 6 is the symbolic diagram of the matrix in Fig. 5 using the notation in Fig. 4; and Figs. 7 and 8 are symbolic diagrams of rectifier matrices employing a minimum of rectifiers for handling 16 and 256 lines with four and eight channels, respectively, having two-position switching devices.

In Fig. 1 rectifier matrix 10 has multiple individual lines 12 emerging which are jointly energized by a voltage source 14 through impedances 16. Only four impedances are shown, additional ones being indicated by the dotted lines. Multiple channels 18 (only three of which are shown) are extended to includes pairs of wires 22aa, 22ab, 22ba, 22bb, etc. One channel 18 is connected to one of each pair of wires 22 by two-position switching devices 24. These may be simple mechanical switches, operated manually or by relays or motor-operated cams, or they may be electronic devices such as scale-of-two counters, in such manner that wires 22a and 22b are differently conditioned electrically. Normally one wire of each pair is energized while the other is not, but both wires may be energized in a distinctively different manner. The mechanical or electronic operation of switching devices 24 is effected by switch control 25.

The rectifier matrix has various uses. For example, voltage supply 14 may be a bias battery and units 16 may be bias resistors for electronic tubes (not shown) where the tube in only one line is to be allowed to conduct space-current for a unique permutation of positions of switching devices 24. This finds application in digital computers. In another use voltage source E may be simply a signal receiver where a pulse is received at a critical time within a cycle, and switches 24 are operated to assume all possible combination sequentially during the cycle of source 14. Under the circumstances when the pulse is received all units 16 except the one to be selected corresponding to the timing of the pulse will be energized. All the units 16 will be deenergized at other times. This system is applicable to multiplex communication. In a further application it is possible to deenergize one circuit 16 and discover the combinational setting of switching devices 14 corresponding to the individual control selection 16 by cycling switching devices 24 until all channels 18 are simultaneously energized or simultaneously deenergized. Novel forms of rectifier matrices rather than uses of such matrices are the subject of this application. The foregoing uses are illustrative.

The manner in which the rectifier matrix achieves the foregoing results will be appreciated from a study of Fig. 2 wherein three channels 118 are arranged in a rectangular matrix for selective connection to eight individual lines 112. (Where feasible, the parts in Fig. 2 bear the same numbers as in Fig. 1, with 100 added.)

In Fig. 2, channel 118a is alternatively switched to wire 122aa or 122ab; and each wire is joined to like terminals of four rectifiers 30, while the rectifiers are connected at their opposite terminals to different ones of the eight lines 112. (Rectifiers 30 are individually designated by the lower case and upper case characters corresponding to the associated channels 118 and individual lines 112.) Channels 118b and 118c are similarly connected through switching devices, wires and dual sets of rectifiers to lines 112. Each line has three rectifiers joined to it, the distribution of the rectifiers being different for the different channels to the end that one line 112 will be deenergized for a given setting of the three switching devices 124, and different lines 112 will be deenergized for different permutations of alternatively energized paired wires 122. Channels 118a are all energized and suitable return circuits are provided for lines 112A, 112B, 112C, etc.

With the switching devices in the configuration shown, it will be apparent that lines 112E, 112F, 112G and 112H will not be energized by channel 118c since line 122ca is not energized. However, lines 112G and 112H are energized by connection of line 118b to line 122bb. Channel 118a, connected to lines 122ab energizes line 112F and line 122H (which is already energized by line 118b). Line 112E it will be observed, is not energized. Lines 112A, 112B, 112C and 112D are all energized by channel 118c through line 122cb. Rectifiers are joined to lines 112 A ... H and to wires 122, with terminals of like polarity connected to those lines and wires respectively, as shown in the wiring diagram. But for rectifiers 30, terminal 112E would be energized by its connection to lines 122aa, 122ba and 122ca to which the energized lines 112 are variously connected. Where rectifier 30Ac is polarized properly to conduct current and thereby energize terminal 112A, rectifier 30Aa would then be a barrier against energization of line 122Aa via rectifier 30Ac. Similarly rectifiers 30Ca and 30Ga are also reversely polarized with respect to the current that might pass through rectifier 30Ac. Likewise, rectifiers 30Ab, 30Bb and 30Fb prevent energization of line 122ba, and rectifiers 30Hc, 30Gc and 30Fc prevent energization of line 122ca. With the connections shown, it is possible to set switching devices 124 in various combinations so as to have a single line 112 deenergized for each different combinational setting of those devices.

Rectifiers 30 may take various forms such as the vacuum-tube diode or the barrier type exemplified by germanium crystal rectifiers. Barrier rectifiers exhibit very high back resistance, ordinarily lower than that of the vacuum-tube diode, but they do conduct to some extent during application of reverse polarity. For this reason it is important to analyze the rectifier matrix to discover whether the back resistance of the rectifiers materially modifies the results described above for ideal blocking rectifiers having infinite back resistance.

The condition of line 112E may be considered typical of any other selected line 112 with another patterned setting of switching devices 124. Rectifiers 30Aa, 30Ca, and 30Ga are evidently substantially in parallel with each other and with rectifiers 30Ab, 30Bb, 30Fb, 30Hc, 30Gc and 30Fc. The back resistance of the rectifiers is thus reduced effectively to $1/9$ of the normal back resistance value of a single rectifier, and should be compared with the forward resistance of the conducting rectifiers that are variously in parallel with each other, and the circuit resistance connected to lines 112 should also be taken into account.

The parallel back resistance of the rectifiers may be acceptable for the three-channel, eight-line rectangular matrix as shown. It will be observed that each line 112 has three rectifiers connected to it. Where four channels 118 are to be joined in a rectangular matrix to lines 112 (which then may be 16 in number rather than 8), four rectifiers 30 would be connected to each line 112, and each of these four would be a member of a group of eight, the others of which would exhibit back resistance, and consequently the back resistance of the rectifiers is reduced to $1/28$ of that of a single rectifier in accordance with the expression $R_b/n(2^{n-1}-1)$. A four-channel rectangular matrix is shown in Fig. 5.

In the rectangular rectifier matrix the number of connections, the number of rectifier elements, and (especially where the back resistance of the rectifier is significantly low), the number of parallel "blocking" rectifiers greatly increases, with resulting decreased back resistance and poorer descrimination between the selected line and the others. In one aspect of the present invention the back resistance characteristic of large matrices using a given type of rectifier is to be improved. This is generally achieved by holding the number of rectifiers connected to any one "output" line to the minimum, two; although the particular matrix chosen within this limitation depends to some extent on the resistances found in the associated circuits.

In Fig. 3 there is shown an illustrative, novel form of rectifier matrix for selecting one line among thirty-two lines 212 which will be deenergized when two-position switching devices 224a—e in five channels 218a—e are set in any definite pattern. (In Fig. 3, the same numbers are used as in Fig. 2 where convenient to represent like parts, with 100 added.) There are five channels 218 each of which selects either one or the other of a pair of wires 222, which select one line among $2^5=32$ individual lines 212. This is characteristic of rectangular and pyramidal matrices as well as the novel matrices. However, the thirty-two line rectifier matrix of the rectangular variety would normally utilize five groups of thirty-two rectifier units each, or a total of 160 rectifiers. The novel matrix illustrated in Fig. 3 employs two groups 232 and 234 of thirty-two rectifiers each, and in addition thirty-two rectifiers arranged in other groups (to be described) for a reduced total of only 96 rectifiers and a reduction in bulk, in number of circuit connections and in paralleled back-resistance rectifier circuits, as will appear.

Each line 212 is connected to one rectifier 230 in each of rectifier groups 232 and 234. It is apparent that the back resistance of a rectifier in one of the groups 232, 234 is higher than in the case where that rectifier is effectively in parallel with multiple other rectifiers that are also connected to that line 212 as in the case of the rectangular matrix.

Rectifiers 230 in group 232 are divided into four sets of eight rectifiers each. The sets have wires 236—239 that may be regarded as a four-wire set of lines, where one line can be selected by a subordinate matrix 240. This matrix has a rectifier group 242 having four rectifiers divided into two sets 242a and 242b of two rectifiers each, and another rectifier group 243 having four rectifiers also divided into two sets 243a and 243b of two rectifiers each. The combined settings of switching devices 224a and 224b in two of the five channels 218 are effective to select one wire of the four wires 236—239.

Group 234 of 32 rectifiers 230 is divided into eight sets of four connected rectifiers each, the like terminals of the several sets being connected to one of the wires 244—251. Subordinate matrix 256 including rectifier groups 252 and 254 is effective to select one of the eight lines 244—251 for its effect on rectifier group 234. The two selected sets of rectifiers, one in each of groups 232 and 234, combine to select a single line 212.

Group 252 of eight rectifiers connected to lines 244—251 is divided into two sets 252a and 252b which are connected to wires 222ca and 222cb. Only one of these wires is energized by switching device 224c in channel 218c.

Group 254 of eight rectifiers also connected to lines 244—251 is divided into four sets of rectifiers which are connected to a further set of wires 258, 259, 260 and 261. One of the wires 258—261 is selected by an eight-rectifier matrix 262 under control of two channels 218d and 218e just as in the eight-rectifier matrix 240 controlled by channels 218a and 218b.

Fig. 3 may be compared to a symbolic representation of the same matrix in Fig. 4f. There the triangle 300 represents the thirty-two individual lines of Fig. 3. The first two squares 332 and 334 in the column adjacent the triangle represent rectifier groups 232 and 234. Two arrows join the triangle with square 332. These represent the combined selective effect of channels 218a and 218b. Circles 342 and 343 to the right of square 332 represent rectifier groups 242 and 243, and are joined by one arrow each to that square. The arrows represent the separate channels 218a and 218b. Square 334 is linked to the triangle by three arrows to represent the combined effect of channels 218c, 218d and 218e in selecting a single line 212. To the right of this square is a further square 354 and a circle 352. This square is joined to square 334 by two arrows to represent the combined effect of two channels 218d and 218e while the circle is joined to square 334 by a single arrow to represent the single control effect of channel 218c. The separate control effects of channels 218d and 218e are combined in square 354 by a pair of four-rectifier groups represented by circles 362 and 364 severally exerting their effects just as in the case of the two channels combined in square 332.

It will be observed that the squares in the column to the right of the triangle both include the numeral 32, which equals the 32 rectifiers in groups 232 and 234. Each of the circles to the right of square 332 contains the numeral 4 which equals the number of rectifiers in each of groups 242 and 243. The enclosures in the single vertical column to the right of square 334 both include the numeral 8, which equals the number of rectifiers in group 252 and in group 254. The circles in the extreme right column joined by arrows to square 354 both include the numeral 4 which equals the two groups of four rectifiers each in matrix 262.

The symbolic notation may be generalized. Within a triangle the number represents the maximum number of lines accommodated. The arrows leaving the triangle represent the number of channels of the power $n$ to which 2 is raised to give the number of lines in the triangle that can be uniquely related to $n$ two-wire channels. Where a single arrow terminates in an enclosure, that enclosure is a circle and no arrow leaves it. Where multiple arrows leave the triangle toward a common enclosure, that enclosure is a square and must be further subdivided into squares and/or circles until individual arrows terminate in individual circles. The number written in a square or circle is $2^p$ where $p$ is the number of arrows leaving the previous enclosure. The total number of two-terminal rectifiers needed to form a matrix is the sum of the numbers in the squares and circles.

Applying the foregoing rules to Fig. 2, it will be readily apparent that the triangle should have "8" within it to represent the eight lines 112 accommodated. Three arrows should be drawn separately to three circles each of which should contain the numeral 8 since three arrows leave the previous enclosure and $2^p=8$. The total number of rectifiers required for this matrix is 24, which is correct as will be seen in Fig. 2.

The symbolic diagram as noted above gives the final number of lines $2^p$ from which one selection is to be made by proper conditioning of $p$ two-position switching devices; it gives the total number of rectifiers in each group of rectifiers and the number of groups of rectifiers in any stage of resolution; the total number of rectifiers required; and in fact it gives complete information on the actual wiring diagram. Three parallel arrows reach square 334, which therefore yields $2^3=8$ wires, and requires the 32 rectifiers to be divided into eight sets. Two parallel arrows reach square 332 which therefore yields $2^2=4$ wires, and requires the 32 rectifiers to be divided onto four sets. A pair of parallel arrows and a single arrow diverge from square 334 to square 354 and circle 352, which consequently yield $2^2=4$ wires and $2^1=2$ wires, respectively, and corresponding subdivisions of the rectifier groups into two and four sets is required.

Using the symbolic diagram technique thus expounded, it becomes quite simple to draw all the possible matrices having 32 lines selectively associated with five two-wire channels, and this has been done in Fig. 4. In Fig. 4a there is shown the five-channel pyramidal matrix, wherein $n-1=4$ stages of resolution are required. In any one stage only one channel is combined with previously combined channels; or, viewed otherwise, each stage of resolution separates one channel from the remaining combined channels. The number of rectifiers is less than in the rectangular matrix, but by no means a minimum. Furthermore, the back resistance of the rectifiers in the network (especially significant with barrier rectifiers) is not utilized to best advantage (depending somewhat on the associated circuits) even though no more than the minimum of two rectifiers are connected to each line yielded at any stage of resolution; for the multiplicity of stages reduces the advantage of providing a minimum number of parallel back-resistance paths in any one stage.

The remaining parts of Fig. 4 show all other five-channel matrix possibilities. Figs. 4a and f have been described. Fig. 4l represents the one-stage resolution characteristic of the known rectangular form of matrix and requires by far the largest number of rectifiers and attendant number of connections, bulk and number of back-resistance paths. Fig. 4g uses the same number of rectifiers as Fig. 4f, utilizing the same resolution down to the three-channel level. It is known that, for three channels, the rectangular matrix and the rectangular matrix are alike in rectifiers required. Figs. 4f and g are the most economical five-channel matrices. The saving of matrices is effected in stages above the three-channel level. The range of possibilities shown in Figs. 4b–k include matrices having the multiple-stage characteristic of the pyramidal matrix without adhering to the pyramidal matrix limitation of combining no more than a single channel with previously combined channels at one stage; and the possibilities include matrices having the rectangular characteristic of combining three or more separate channels or groups of channels in one stage.

It will be shown that the most economical matrix from the viewpoint of the number of rectifier units required can be directly determined by dividing the number of arrows leaving the previous enclosure in two groups each terminating in an enclosure, where the number of arrows is greater than 3; and by making the numbers of arrows in these groups as nearly alike as possible. In terms of circuits this means that no more than two groups of rectifiers are to be connected to any set of lines in which more than three channels are combined (indicating that only two rectifiers, one from each group, are connected to any one line in stages that combine more than three channels); and the rectifiers of each group are to be divided into two times $2^p$ equal sets where $p$ is the number of channels having input wires connected to the group of rectifiers. This can be verified for the case in the thirty-two line, five-channel matrix in Fig. 4. In Figs. 4a to e, the division of the arrows leaving the triangle is four and one, an unequal split. In Figs. 4h to l, the division is into more than two groups. Figs. 4f and 4g comply with the stated rules, and are most economical. Figs. 4b, 4c, 4d and 4e are alike in the first stage of resolution. In the further subdivision of four channels, Fig. 4c is most economical. Fig. 4b incorporates an unequal split and Figs. 4d and 4e subdivided into more than two groups. These rules for the most economical matrix from the viewpoint of number of rectifiers required can be proved mathematically (1) Let $N(n)$ be a function of the positive discrete variable $n$ and let it be equal to the number of rectifiers needed to make a network which selects one from $2^n$ positions. Notice that when $n>3$, $N(n)$ has several values for any value of $n$. The interpretation here to be used is that $N(n)$ represents any one of its possible positive values.

(2) Let $E(n)$ be the particular single-valued function which corresponds to the number of rectifiers needed to make the network by following the rules which have been given for designing the most economical network.

(3) What will be proved is that $$N(n) \geqq E(n) \qquad (1)$$

Only one four-position network can be drawn, and the two possible eight-position networks each require the same number of rectifiers. This can be seen by drawing all possible four-position and eight position networks.

Because the proof is so involved, it will be given in outline and then in detail.

*Step 1.*—Divide the class $N(n)$ into two mutually exclusive sub-classes $N_1(n)$ and $N_2(n)$ defined in the roof. Then demonstrate that $$N_1(n) \geqq E(n) \qquad (2)$$

*Step 2.*—Divide the subclass $N_2(n)$ into two mutually exclusive sub-sub-classes $N_3(n)$ and $N_4(n)$ defined in the proof. Then demonstrate that $$N_3(n) \geqq E(n) \qquad (3)$$

*Step 3.*—Demonstrate that $$N_4(n) \geqq E(n) \qquad (4)$$

thereby proving inequality (1) since the class $N(n)$ includes only the mutually exclusive subclases $N_1(n)$, $N_3(n)$, and $N_4(n)$.

Before carrying out these three steps one other thing should be done. It happens that inequality (1) calls for experimental vertification for all values of $n$ which are less than or equal to 6. This was performed by drawing each of the shorthand diagrams for the various values of $E(n)$, given in Fig. 7 for four channels and Figs. 4f and g for five channels; and considering the consequences which would have resulted fom any deviation from the rules for drawing the most economical network.

In the following table there are listed the values of $E(n)$ derived by drawing diagrams of all matrices conceivable and selecting the most economical ones which proved to be in accord with the rules stated, while all matrices not in accord with the rules required a greater number of rectifiers. Fig. 8 shows the most economical eight-channel matrix, drawn in accord with the stated rules.

| $n$ | $E(n)$ | $2^n$ | $2 \cdot 2^n$ | $3 \cdot 2^n$ |
|---|---|---|---|---|
| 2 | 8 | 4 | 8 | 12 |
| 3 | 24 | 8 | 16 | 24 |
| 4 | 48 | 16 | 32 | 48 |
| 5 | 96 | 32 | 64 | 96 |
| 6 | 176 | 64 | 128 | 192 |
| 7 | 328 | 128 | 256 | 384 |
| 8 | 608 | 256 | 512 | 768 |
| 9 | 1,168 | 512 | 1,024 | 1,536 |
| 10 | 2,240 | 1,024 | 2,048 | 3,072 |
| 11 | 4,368 | 2,048 | 4,096 | 6,144 |
| 12 | 8,544 | 4,096 | 8,192 | 12,288 |

In the table it is apparent that $E(n)$ seems to approach $2 \cdot 2^n$ as $n$ gets large, but that $E(n)$ is greater than $2 \cdot 2^n$ when $n$ is greater than 2. This is true because $2 \cdot 2^n$ rectifiers are needed to attach two rectifiers to each line, and attaching at least two rectifiers is necessary but not adequate. From the table it can be seen that $E(n)$ is equal to or less than $3 \cdot 2^n$, at least up to $n=12$.

*Step 1.*—In order to define the sub-classes $N_1(n)$ and $N_2(n)$ reference is had to the shorthand notation. Let $N_2(n)$ represent the number of rectifiers needed to make any network for which the shorthand notation shows the arrows from the triangle going to two and only two enclosures. Let $N_1(n)$ represent the number of rectifiers needed to make any other network. (In other words let $N_1(n)$ represent the number of rectifiers needed to make a network for which the shorthand shows the arrows from the triangle going to more than two enclosures.)

It is evident from the shorthand that $$N_1(n) \geqq 3 \cdot 2^n \qquad (5)$$

This is so because each group of arrows from the triangle to an enclosure represent $2^n$ rectifiers and there are at least 3 of these groups.

It is also evident for much the same reason that $$E(n) = \begin{cases} 2 \cdot 2^n + 2 \cdot E(n/2), & \text{when } n \text{ is even} \\ 2 \cdot 2^n + E\left(\frac{n+1}{2}\right) + E\left(\frac{n-1}{2}\right), & \text{when } n \text{ is odd} \end{cases} \qquad (6)$$

$E(n/2)$ is the single-valued function which corresponds to the number of rectifiers needed to make an $n/2$-position rectifier network by following the rules given for designing the most economical network; (two $n/2$-position networks are needed for further resolution of $2^n$ lines into $n$ channels after the first step of resolution that has two groups of $2^n$ rectifiers).

$$E\left(\frac{n-1}{2}\right) \text{ and } E\left(\frac{n+1}{2}\right)$$

are similarly the number of rectifiers needed for the further resolution of the network where $n$ is odd.

Equation 6 may be simplified to $$E(n) \geq 2 \cdot 2^n \quad (7)$$

The next inequality $$E(n) \leq 3 \cdot 2^n \quad (8)$$

will be demonstrated by the method of mathematical induction.

Proof that inequality (1) holds at least when $n$ is less than or equal to 6 comes from an inspection of the first half of the table above.

It may be assumed tentatively that inequality (8) is true for all values of $n$ which are less than or equal to a particular value designated as $r$. Now it will be proved that, if $r$ is greater than or equal to 6, the inequality holds for the next value of $n$ which is $r+1$.

This proof will be carried out first for odd values of $r+1$. Inserting this value in Equation 6:

$$E(r+1) = 2 \cdot 2^{r+1} + E(r/2+1) + E(r/2) \quad (9)$$

Now inserting inequality (8) into Equation 9:

$$E(r+1) \leq 2 \cdot 2^{r+1} + (3 \cdot 2^{r/2+1} + 3 \cdot 2^{r/2}) \quad (10)$$

Notice that whenever $r$ is greater than or equal to 6 inequality (10) can be rewritten as:

$$E(r+1) < 2 \cdot 2^{r+1} + (1 \cdot 2^{r+1}) \quad (11)$$

because $$1 \cdot 2^{r+1} > 3 \cdot 2^{r/2+1} + 3 \cdot 2^{r/2} \text{ when } r \geq 6. \quad (12)$$

therefore $$E(r+1) < 3 \cdot 2^{r+1} \text{ for } r \geq 6 \quad (13)$$

The same expressions can be rewritten for the case when $r+1$ is even.

$$E(r+1) = 2 \cdot 2^{r+1} + 2 \cdot E\left(\frac{r+1}{2}\right) \quad (14)$$

and, from (7)

$$E(r+1) \leq 2 \cdot 2^{r+1} + 2 \cdot 2 \cdot 2^{\left(\frac{r+1}{2}\right)} \quad (15)$$

Wherefor $$E(r+1) \leq 3 \cdot 2^{r+1} \text{ when } r \geq 3 \quad (16)$$

because $$2^{r+1} \geq 2 \cdot 2 \cdot 2^{\frac{r+1}{2}} \text{ when } r \geq 3 \quad (17)$$

Therefore, by mathematical induction $$E(n) \leq 3 \cdot 2^n \quad (18)$$

for all positive integral values of $n$. The smallest admissible value of the integer has been verified by the table, and it has been shown that, if the theorem is true for one value $r$, it is true for the next greater value $r+1$. Together inequalities (5) and (18) demonstrate that $$N_1(n) \geq E(n) \quad (19)$$

and because $$N_1(n) > 3 \cdot 2^n \text{ where } n > 3 \quad (20)$$

$$N_1(n) > E(n) \text{ when } n > 3 \quad (21)$$

meaning that there should be a resolution into two groups of rectifiers and not more at any stage of resolution above the three-channel level for the most economical network.

Next to be proved is that the division of arrows between the squares should be as even as possible for best economy above the three-channel level. This is done in two stages. The first stage (step 2) will prove that the division must be within one arrow of being as even as possible, and in the second stage (step 3) the case of division which is as even as possible will be compared with the case which differs by one arrow

*Step 2.*—It will be proved that the division of arrows must be within one arrow of being as even as possible for the case of even numbers and then for odd numbers.

If $n$ is an even number and if an even division is made $$E(n) = 2 \cdot 2^n + 2 \cdot E(n/2) \leq 2 \cdot 2^n + 2 \cdot 3 \cdot 2^{n/2} \quad (22)$$

If an uneven split is made $$N_2(n) = 2 \cdot 2^n + E(n/2+m) + E(n/2-m) > 2 \cdot 2^n + 2 \cdot 2^{n/2+m} + 2 \cdot 2^{n/2-m} \quad (23)$$

Notice that $$N_2(n) > E(n) \text{ if } m \geq 2 \quad (24)$$

because $$2 \cdot 2^{n/2+2} > 2 \cdot 3 \cdot 2^{n/2} \text{ if } m \geq 2 \quad (25)$$

Next consider the case in which $n$ is an odd number. If the most nearly even division is made $$E(n) = 2 \cdot 2^n + E\left(\frac{n+1}{2}\right) + E\left(\frac{n-1}{2}\right) \quad (26)$$

Substituting inequality (5) in Equation 26 and enlarging one term $$E(n) \leq 2 \cdot 2^n + 2 \cdot 3 \cdot 2^{\frac{n+1}{2}} \quad (27)$$

If a less even division is made $$N_2(n) = 2 \cdot 2^n + E\left(\frac{n+1}{2}+m\right) + E\left(\frac{n-1}{2}-m\right) \quad (28)$$

and substituting (6) in (28) and dropping a term $$N_2(n) > 2 \cdot 2^n + 2 \cdot 2^{\frac{n+1}{2}+m} \quad (29)$$

Therefore $$N_2(n) > E(n) \text{ when } m \geq 2 \quad (30)$$

because $$2 \cdot 2^{\frac{n+1}{2}+2} > 2 \cdot 3 \cdot 2^{\frac{n+1}{2}} \quad (31)$$

Now $N_3(n)$ can be defined as those values of $N_2(n)$ in which $m \geq 2$ and $N_4(n)$ as the rest of the values of $N_2(n)$.

Rewriting (30) and combining with (24)

$$N_3(n) > E(n) \quad (32)$$

*Step 3.*—In order to proceed with the proof and demonstate that $(m=0)$ is better than $(m=1)$, rather delicate tests must be applied. Consider four cases.

In the first case, let $$n = 4p \quad (33)$$

For the even division write $$E(4p) = 2 \cdot 2^{4p} + 2 \cdot 2 \cdot 2^{2p} + 4E(p) \quad (34)$$

While the odd division gives $$N(4p) = 2 \cdot 2^{4p} + E(2p+1) + E(2p-1) \quad (35)$$

$$N(4p) = 2 \cdot 2^{4p} + 2 \cdot 2^{2p+1} + 2 \cdot 2^{2p-1} + E(p+1) + 2E(p) + E(p-1) \quad (36)$$

Writing the appropriate inequalities for (34) and (36), $$E(4p) \leq [2 \cdot 2^{4p} + 2 \cdot 2 \cdot 2^{2p} + 2E(p)] + 2 \cdot 3 \cdot 2^p \quad (37)$$
$$N(4p) > [2 \cdot 2^{4p} + 2 \cdot 2 \cdot 2^{2p} + 2E(p)] + 2^{2p} +$$
$$2 \cdot 2 \cdot 2^p + 2 \cdot 2^{p-1} \quad (38)$$

It is then obvious that $$E(4p) < N(4p) \text{ when } p \geq 1 \quad (39)$$

The same procedure may be applied to the other cases where $n = 4p+1$, $4p+2$, and $4p+3$, but the details will not be written since the method has been demonstrated.

The validity of the rules for writing the circuit diagrams for the most economical rectifier network switch and thus for the circuit, has been demonstrated.

In the foregoing, all of the $2^n$ lines of any $n$-channel matrix have been regarded as required. However, it is perfectly sensible in some cases to dispense with certain of the total possible lines; for this invention applies equally to those matrices where all the possible lines are utilized as where certain of them are disregarded. An important aspect of the invention resides in the provision of the most economical matrix or matrices, as the case may be, for any number of input channels; but the other novel matrices are of like importance in special circumstances, as where symmetry, interchangeability of submatrices, and relation of back resistances to resistances in the circuits associated with the matrix.

In some parts of this disclosure the paired wires are termed "input" wires or "input" channels and the individual lines are termed "output" lines. These terms are in accord with the usual relations, but are used for convenience and not to restrict the matrix circuits to such use as against the reverse translation where the input may appear at the individual lines.

Varied modifications and applications of the novel aspects of the foregoing disclosure will occur to those skilled in the art; and it is therefore fitting that the appended claims be given broad interpretation, consistent with the spirit and scope of the invention.

What is claimed is:

1. A rectifier matrix having $2^n$ lines and $n$ two-wire channels where $n$ is any positive integer greater than 3, said matrix being successively reduced from $2^n$ lines to $n$ channels by a network including pairs of rectifiers having like terminals connected to said lines, said rectifiers being divided into two groups, the remaining terminals of the rectifiers being joined in equal sets of $2^k$ in one group and $2^m$ of the other group where $k$ and $m$ are positive integers totaling $n$, and $m$ and $k$ are as nearly equal as possible.

2. A barrier rectifier matrix having $2^n$ lines and $n$ two-wire channels where $n$ is any positive integer greater than 3, said matrix being successively reduced from $2^n$ lines to $n$ channels by a network including pairs of rectifiers having like terminals connected to said lines, said barrier rectifiers being divided into two groups, the remaining terminals of the barrier rectifiers being joined in sets of $2^k$ in one group and $2^m$ of the other group where $k$ and $m$ are positive integers totaling $n$, and $m$ and $k$ are as nearly equal as possible.

3. A matrix having $2^n$ individual lines and $n$ pairs of wires such that combinations of the wires in alternative conditions will be uniquely related to different ones of the lines, said matrix having only two rectifier groups connected to said lines with one rectifier of each group having a like terminal joined to each of said lines, there being $2^n$ rectifiers in each group, each of said rectifier groups being joined at their opposite terminals to constitute plural pairs of rectifier sets, and further groups of rectifiers connected to said pairs of sets for further resolution of said wires into unique relationship with said individual wires.

4. A matrix having $2^n$ individual lines and $n$ pairs of wires such that combinations of the wires in alternative conditions will be uniquely related to different ones of the lines, said matrix including two rectifier groups with $2^n$ rectifiers in each group, the rectifiers of each group having like terminals joined to each of said lines, each of said rectifier groups being joined at their opposite terminals in plural pairs of sets, and further groups of rectifiers connected to said pairs of sets for further resolution of said paired wires into unique relationship with said individual lines.

5. A matrix having a group of individual lines connected in a network to plural sets of wires, one of said lines being electrically distinctive from the other lines, one wire of each set of wires being similarly distinctive, said matrix including two groups of rectifiers, one rectifier in each group being connected at a terminal of one polarity to one of said individual lines, the other rectifiers of each group being similarly connected to others of said lines, the rectifiers of each group being joined at their terminals of opposite terminals into plural pairs of sets, one of each of said wires being connected to a respective one of said rectifier sets.

6. A rectifier matrix, of which $2^n$ lines are resolved into $n$ two-wire channels, where $n$ is any integer greater than 3, said matrix comprising a network including pairs of rectifiers having like terminals connected to said lines, said rectifiers being divided into two groups, the remaining terminals of the rectifiers being joined in sets of $2^k$ in one group and $2^m$ in the other group to yield sets of $2^m$ wires and $2^k$ wires respectively where $k$ and $m$ total $n$ and are integers larger than one.

7. A rectifier matrix having any number of lines up to $2^n$ where $n$ is the number of associated two-wire channels, comprising rectifier submatrices embodying both rectangular and pyramidal matrix characteristics.

NATHANIEL ROCHESTER.

REFERENCES CITED

The following references are of record in the file of this patent:

UNITED STATES PATENTS

| Number | Name | Date |
| --- | --- | --- |
| 876,701 | Drewell | Jan. 14, 1908 |
| 1,928,093 | Coyle | Sept. 26, 1933 |
| 2,399,777 | Wight | May 7, 1946 |

FOREIGN PATENTS

| Number | Country | Date |
| --- | --- | --- |
| 499,900 | Great Britain | Jan. 31, 1939 |

OTHER REFERENCES

Ser. No. 108,062, Toulon (A. P. C.), published May 18, 1943.